United States Patent [19]
Lee et al.

[11] Patent Number: 6,133,388
[45] Date of Patent: Oct. 17, 2000

[54] PROCESS FOR PREPARING STYRENE-BUTADIENE RUBBER OR BUTADIENE RUBBER BY SOLUTION POLYMERIZATION

[75] Inventors: Ki Young Lee; Bum Jae Lee, both of Taejon, Rep. of Korea

[73] Assignee: Hankook Tire Co., Ltd., Seoul, Rep. of Korea

[21] Appl. No.: 09/398,772

[22] Filed: Sep. 20, 1999

[30] Foreign Application Priority Data

Mar. 3, 1999 [KR] Rep. of Korea ............... 99-6856

[51] Int. Cl.$^7$ ............... C08F 4/48; C08F 8/32; C08F 8/42
[52] U.S. Cl. ............... 526/180; 525/332.3; 525/332.9; 525/333.2; 525/342; 525/370; 525/382
[58] Field of Search ............... 526/180; 525/342, 525/370, 382, 332.3, 332.9, 333.2

[56] References Cited

U.S. PATENT DOCUMENTS

| | | | |
|---|---|---|---|
| 3,326,881 | 6/1967 | Uraneck et al. | 526/180 X |
| 4,397,994 | 8/1983 | Takeuchi et al. | |
| 4,550,142 | 10/1985 | Akita et al. | |
| 5,274,106 | 12/1993 | Lawson et al. | 526/180 X |

*Primary Examiner*—Fred Teskin

[57] ABSTRACT

This invention relates to a process for preparing styrene-butadiene rubber or butadiene rubber with both ends of the polymer chain modified by solution polymerization, wherein styrene-butadiene rubber or butadiene rubber is polymerized using a monofunctional anionic polymerization initiator modified with amines or the like, and then the active anion at the ends of the polymer chain is reacted with the commonly available modifier. Unlike a bifunctional initiator that shows a poor solubility in a nonpolar solvent, an increase in viscosity and loss of modification efficiency induced by impurity, styrene-butadiene rubber or butadiene rubber by solution polymerization can be prepared using the modified anionic polymerization initiator of the invention.

4 Claims, No Drawings

PROCESS FOR PREPARING STYRENE-BUTADIENE RUBBER OR BUTADIENE RUBBER BY SOLUTION POLYMERIZATION

FIELD OF THE INVENTION

This invention relates to a process for preparing butadiene rubber (hereinafter referred to as "BR") or styrene-butadiene rubber (hereinafter referred to as "SBR") in solution by polymerizing 1,3-butadiene alone or with styrene using a monofunctional anionic initiator modified with amines or the like. More particularly, this invention relates to the process for preparing SBR or BR with both ends of polymer chain modified, using a modified anionic initiator containing functional groups which shows the excellent solubility, without any separate pretreatment, in a nonpolar hydrocarbon solvent and little increase in viscosity or gelation induced by denaturing step at the end of polymerization, thus ensuring excellent braking property in driving, abrasion resistance including low fuel cost.

DESCRIPTION OF THE RELATED ART

In general SBR or BR is prepared by the method of solution polymerization or emulsion polymerization. Unlike the emulsion polymerization method, the solution polymerization method has recognized several advantages in that (1) microstructural control or monomer sequence with polymer chain may be easily made available, and (2) the ends of polymer chain can be coupled using tin or silicon compound, or modified by a compound containing amine or hydroxy group to decrease the number or mobility of polymer chain at the ends, thus enhancing the boding strength with carbon black. Therefore, SBR or BR prepared by solution polymerization as a tire tread rubber may reduce a fuel consumption, while controlling various properties of tire such as braking property and abrasion resistance.

Several methods for preparing SBR or BR by solution polymerization have been reported hitherto; for example, there has been provided a method by polymerizing styrene-butadiene in a nonpolar solvent using alkyllithium as a monofunctional initiator to activate the ends of polymer chain and then an active anion, so generated, is coupled to the ends of polymer chain using tin compound (e.g., SnCl4) as a binder (U.S. Pat. No. 4,397,994); or, another method has been disclosed in which a rubber is reacted with benzophenone derivatives as an organic modifier to modify one end of polymer chain (U.S. Pat. No. 4,550,142).

However, when one end of polymer chain in SBR is bonded or modified using alkyllithium as a monofunctional initiator, more than half portions in polymer chain are in bonding-free or unmodified state, whereby increasing hysteresis of rubber leads to reduction of fuel efficiency due to a higher rolling resistance of running tire.

Another method for preparing SBR or BR with both ends of polymer chain modified has been reported in such a manner that the polymerization is carried out using a sodium naphthalide as a bifunctional initiator, followed by the reaction with the aforementioned binder or modifier. However, since a majority of the bifunctional initiators have a poor solubility in nearly all nonpolar hydrocarbon solvents, a polor solvent in whole or in part should be used during polymerization. Furthermore, excessive use of polar solvent may change the microstructure of polymer by solution polymerization (expecially, increase of vinyl content in butadiene portion) which leads to a higher glass transition temperature of rubber, thus affecting various properties such as rolling resistance and braking properties. In addition, when the ends of polymr chain are modified or coupled, the increasing viscosity in solution induced by aggregation of polymer chain ends makes the polymerization process difficult. Even in severe cases, gelation of polymer may occur.

Another method for preparing SBR or BR with both ends of polymer chain modified by solution polymerization has been also reported in such a manner that the polymerization is carried out using a monofunctional initiator containing tin compound for coupling it to the ends of polymer (U.S. Pat. No. 5,463,004). Notwithstanding this, this method has failed to improve the solubitily of initiator in a nonpolar hydrocarbon solvent.

SUMMARY OF THE INVENTION

To overcome the aforementioned shortcomings, an object of this invention is to provide the process for preparing SBR or BR with both ends of polymer chain modified, using a modified anionic polymerization initiator which shows the excellent solubility, without any separate pretreatment, in a nonpolar hydrocarbon solvent and little increase in viscosity or gelation induced by modifying step at the end of polymerization, thus ensuring excellent braking property in driving, abrasion resistance including low fuel cost.

To achieve the above objective, the process for preparing SBR or BR of this invention is characterized by polymerizing 1,3-butadiene alone or with styrene in a nonpolar hydrocarbon solvent using a compound represented by the following formula I as an initiator.

Formula I

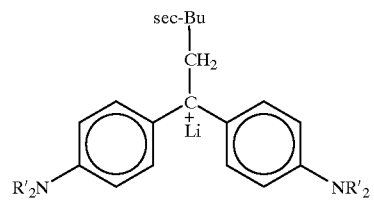

wherein,

R' is an alkyl group of 1 to 3 carbon atoms, and sec-Bu is a secondary butyl group.

DETAILED DESCRIPTION OF THE INVENTION

The detailed examples of modified monofunctional anionic initiator represented by the formula I include one compound selected from the group consisting of 1,1-di(4-dimethylaminophenyl)-3-methylpentyllithium.

Unlike the conventional bifunctional initiator, the monofunctional initiator of this invention functions as a modifier simultaneously, while having a very high solubility in a nonpolar hydrocarbon such as cyclohexane.

The initiator of this invention can be prepared via reaction between highly effective secondary butyllithium and a precursor (e.g., 1,1-di(4-dimethylaminophenyl)ethylene or 1,1-di(4-diethylaminophenyl)ethylene), as shown below.

Scheme

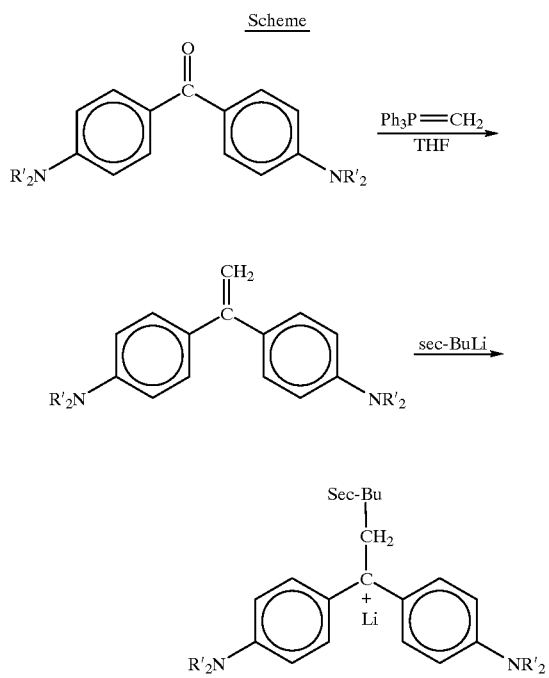

wherein,

R' is an alkyl group of 1 to 3 carbon atoms, and Bu is a butyl group.

As illustrated in the above scheme, a benzophenone derivative is reacted with triphenylmethylphosphonium ilide in the presence of tetrahydrofuran to synthesize a precursor.

The precursor, so prepared, is reacted with the secondary butyllithium to obtain a compound as a monofunctional initiator represented by the formula I.

Since all of the aforementioned precursors have no side reactions with butyllithium, the initiator, so prepared, has a high solubility so that it can be employed in a nonpolar hydrocarbon solvent such as cyclohexane without pretreatment. Further, the monofunctional anionic polymerization initiator of this invention can control the modification efficiency in an easier manner, unlike a bifunctional initiator which encounters with many shortcomings such as increase in viscosity or gelation in a severe case induced by denaturing step at the end of polymerization.

The successive steps for preparing SBR or BR using the modified monofunctional anionic polymerization initiator are as follows:

First, the modified monofunctional anionic polymerization initiator represented by the formula I is reacted with 1,3-butadiene alone or with styrene to give a polymer represented by the following formula II;

Formula II

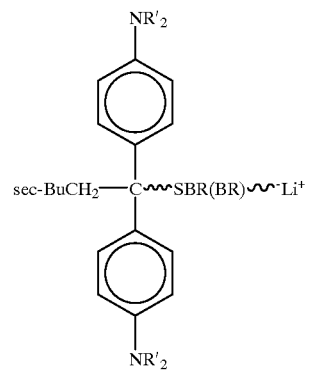

wherein,

SBR is a styrene-butadiene rubber; BR is a butadiene rubber; R' and sec-Bu are same as defined above.

The polymerization is carried out under general polymerization conditions, preferably at the temperature of 20 to 90° C. for 1 to 5 hours.

As represented in the formula II, one end of polymer chain in SBR or BR is modified and its other end contains an active anion.

Then, a commonly available modifier is added to each end of polymer chain in SBR or BR to prepare SBR or BR by solution polymerization with both ends modified represented by the following formula III.

Hence, the commonly available modifier refers to amine derivatives, tin or silicon compound. The modifier is reacted with an active anion represented by the formula II to prepare SBR or BR containing functional groups at both ends of polymer by solution polymerization.

Formula III

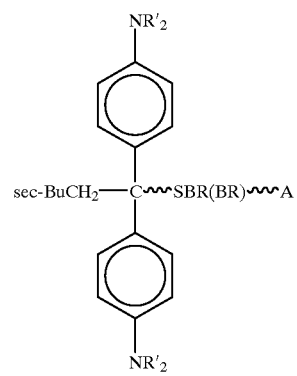

wherein,

R', SBR, BR and sec-Bu are same as defined above;

A is —(CH$_2$)n Si(OEt)$_3$ (wherein n is 0~3), —Sn(Bu)$_3$ or the following group:

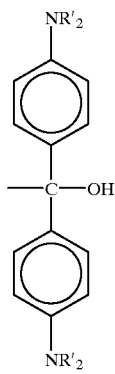

(wherein, R' is same as defined above).

SBR or BR having both ends of polymer chain modified, so prepared using the modified monofunctional anionic polymerization initiator according to this invention, is quite effective in a tire tread rubber.

The following specific examples are intended to be illustrative of this invention and should not be construed as limiting the scope of the invention.

MANUFACTURING EXAMPLE

Synthesis of an Anionic Polymerization Initiator
(1) Synthesis of Precursors
 1) Synthesis of 1,1-di(4-dimethylaminophenyl)ethylene (Hereinafter Referred to as "2-DMAPE")

A solution of 0.1 mole of 4,4'-bis(dimethylamino) benzophenone (hereinafter referred to as "2-DMABP") dissolved in 100 ml of tetrahydrofuran (THF) was slowly poured into a THF solution (100 ml) containing 0.11 moles of dissolved triphenylmethylphosphonium ilide obtained via reaction between triphenylmethylphosphonium iodide and methyllithium. Then, the reaction mixture was reacted at 0° C. for 4 hours, followed by purification to synthesize the title compound.

2) Synthesis of 1,1-di(4-diethylaminophenyl)ethylene [Hereinafter Referred to as "2-DMAPE"]

In the same procedure as described in the above 1), the title compound was synthesized except for using 4,4'-bis (diethylamino)benzophenone [hereinafter referred to as "2-DEABP"].

(2) Synthesis of an Anionic Polymerization Initiator
 1) Synthesis of 1,1-di(4-dimethylaminophenyl)-3-methylpentyllithium [2-DMAPLi]

The sec-butyllithium solution (1.5 moles in cyclohexane) was reacted with 2-DMAPE, so synthesized previously, in a molar ratio to synthesize the title compound.

2) Synthesis of 1,1-di(4-dimethylaminophenyl)-3-methylpentyllithium [2-DEAPLi]

The sec-butyllithium solution (1.5 moles in cyclohexane) was reacted with 2-DEAPE, so synthesized previously, in a molar ratio to synthesize the title compound.

EXAMPLE 1

A 10-liter stainless steel autoclave was dried under vacuum. Then, it was charged with 5,000 g of cyclohexane as solvent, 50 g of THF designed to control the microstructure, 200 g of styrene and 800 g of butadiene as monomer is a successive manner. While maintaining the temperature of reaction system at 50° C., 10 mmoles of 1,1-di(4-diethylaminophenyl)-3-methylpentyllithium (an initiator synthesized from the manufacturing example) was added to the reaction mixture and subjected to polymerization for 3 hours. After the polymerization was completed, 20 mmoles of 4,4'-bis(diethylamino)benzophenone [2-DEABP] was further added to the reaction mixture at 60° C. for 1 hour for the modification of polymer ends and then the reaction was terminated with methylalcohol. The reactant was precipitated in isopropyl alcohol containing an antioxidant and dried to obtain SBR by solution polymerization having both ends of polymer chain modified.

EXAMPLE 2

In the same procedure as described in Example 1, the SBR by solution polymerization was prepared except for using tributyltinchloride (TBTC) instead of 2-DEABP for having both ends of polymer chain modified.

EXAMPLE 3

In the same procedure as described in Example 1, the SBR by solution polymerization was prepared except for using triethoxysilylchloride (TESC) instead of 2-DEABP for having both ends of polymer chain modified.

COMPARATIVE EXAMPLE 1

To compare SBR specimens with both ends of polymer chain modified and with one end of polymer chain modified, polymerization was carried out in the same manner as described in Example 1 but without modification, the reaction mixture was immediately precipitated and dried to obtain SBR with one end of polymer chain modified only.

COMPARATIVE EXAMPLE 2

In the same procedure as described in Example 1, the SBR was prepared except the polymerization was carried out in the presence of butyllithium as anionic polymerization initiator but without modification, the reaction mixture was immediately precipitated and dried to obtain SBR without modifying.

EXAMPLE 5

A 10-liter stainless steel autoclave was dried under vacuum. Then, it was charged with 5,000 g of cyclohexane as solvent, 20 g of THF designed to control the microstructure and 1,000 g of butadiene as monomer is a successive manner. While maintaining the temperature of reaction system at 50° C., 10 mmoles of 1,1-di(4-diethylaminophenyl)-3-methylpentyllithium (an initiator synthesized from the manufacturing example) was added to the reaction mixture and subjected to polymerization for 3 hours. After the polymerization was completed, 20 mmoles of 4,4'-bis(diethylamino)benzophenone [2-DEABP] was further added to the reaction mixture at 60° C. for 1 hour for the modification of polymer ends and then the reaction was terminated with methylalcohol. The reactant was precipitated in isopropylalcohol containing an antioxidant and dried to obtain BR by solution polymerization having both ends of polymer chain modified.

EXAMPLE 6

In the same procedure as described in Example 5, BR was prepared except for using tributyltinchloride (TBTC) instead of 4,4'-bis(diethylamino)benzophenone for having both ends of polymer chain modified.

EXAMPLE 7

In the same procedure as described in Example 5, BR was prepared except for using triethoxysilylchloride (TESC) instead of 4,4'-bis(diethylamino)benzophenone.

EXAMPLE 8

In the same procedure as described in Example 5, BR was prepared except for using 1,1-di(4-dimethylaminophenyl)-3-methylpentyllithium as polymerization initiator.

COMPARATIVE EXAMPLE 3

To compare BR specimens with both ends of polymer chain modified and with one end of polymer chain modified, polymerization was carried out in the same manner as described in Example 4 and without modification, the reaction mixture was immediately precipitated and dried to obtain BR with one end of polymer chain modified only. The results were shown in the following table 3.

COMPARATIVE EXAMPLE 4

In the same procedure as described in Example 5, the BR was prepared except that polymerization was carried out in the presence of butyllithium as polymerization initiator and without modification, the reaction mixture was immediately precipitated and dried to obtain BR without modifying.

EXPERIMENTAL EXAMPLE 1

The properties of polymer was measured. Each SBR specimen, so prepared from Example 1 to 4 and Comparative examples 1 to 2, was mixed by an internal mixer and roll based on the chemical composition shown in the following table 1 and vulcanized at 145° C. for an optimum vulcanization time ($t_{90}$) to prepare each rubber specimen. The property results of each specimen was shown in the following table 2.

Hence, the properties of each specimen was measured as follows:

Styrene content (%), vinyl content (%): measured by 300 MHz NMR.

Mooney viscosity ($ML_{1+4}$@100° C.): After each specimen was preheated by Mooney viscometer and large-scale rotor for 100° C. for 1 minute; torque value was measured after 4 minutes.

tan δ (0° C., 20° C., 60° C.): a dynamic loss coefficient measured in the frequency of 10 Hz and modification degree of 0.5% using RDS.

TABLE 1

| Component | Content(part by weight) |
| --- | --- |
| Rubber | 100 |
| Carbon black(HAF-HS) | 50 |
| Stearic acid | 2 |
| Zinc oxide | 3 |
| Aromatic oil | 5 |
| N-cyclohex-2-benzothiazyl sulfenamide | 1.4 |
| Sulfur | 1.8 |

TABLE 2

| | | Example | | | Comp. Example | |
| --- | --- | --- | --- | --- | --- | --- |
| | Category | 1 | 2 | 3 | 1 | 2 |
| A | Initiator | 2-DEAPLi | 2-DEAPLi | 2-DEAPLi | 2-DEAPLi | n-BuLi |
| | Modification degree | both ends | both ends | both ends | one ends | Non |
| | Modifier | 2-DEAPE, 2-DEABP | 2-DEAPE, TBTC | 2-DEAPE, TESC | 2-DEAPE | — |
| | Styrene content (wt %) | 20 | 20 | 20 | 20 | 20 |
| | Vinyl content (wt %) | 57 | 58 | 60 | 60 | 61 |
| | Mooney viscosity ($ML_{1+4}$ @ 100° C.) | 48 | 46 | 48 | 47 | 49 |
| B | Tensile strength (kg/cm$^2$) | 245 | 235 | 240 | 230 | 205 |
| | tan δ @ 0° C. | 0.673 | 0.688 | 0.670 | 0.690 | 0.678 |
| | tan δ @ 60° C. | 0.079 | 0.081 | 0.081 | 0.093 | 0.108 |

Note: A means "polymerization conditions and properties."
B means "property of vulcanized rubber."

From the above table 2, it was revealed that when each SBR specimen having both ends of polymer chain modified (Examples 1 to 3), so prepared using the modified monofunctional anionic polymerization initiator according to this invention was compared with other SBR specimens having one end of polymer chain modified (Comparative example 1) or having no polymer chain modified (Comparative example 2), the microstructure and Mooney viscosity (molecular weight) of polymer was similar but each SBR specimen having both ends of polymer chain modified showed better property of vulcanized rubber than other SBR specimens with one end of polymer chain modified. In particular, each SBR specimen having both ends of polymer chain modified proven to be better effective than other SBR specimens with one end of polymer chain modified from the standpoint of the low fuel cost, since the former had extremely low tan δ value at 60° C., an indices of rolling resistance in tire operation.

EXPERIMENTAL EXAMPLE 2

In the same procedure as described in Experimental example 1, the properties of each BR specimen, so prepared from Examples 5 to 8 and Comparative examples 3 to 4, were measured and the results were shown in the following table 3.

TABLE 3

| | Category | Example 5 | 6 | 7 | 8 | Comp. Example 3 | 4 |
|---|---|---|---|---|---|---|---|
| A | Initiator | 2-DEAPLi | 2-DEAPLi | 2-DEAPLi | 2-DEAPLi | 2-DEAPLi | n-BuLi |
| | Modification degree | both ends | both ends | both ends | both ends | one ends | None |
| | Modifier | 2-DEAPE, 2-DEABP | 2-DEAPE, TBTC | 2-DEAPE, TESC | 2-DMAPE, 2-DEABP | 2-DEAPE | — |
| | Vinyl content(wt %) | 41 | 43 | 42 | 43 | 42 | 43 |
| | Mooney viscosity ($ML_{1+4}$ @ 100° C.) | 42 | 43 | 42 | 44 | 41 | 42 |
| B | Tensile strength ($kg/cm^2$) | 182 | 178 | 180 | 183 | 172 | 156 |
| | tan δ @ 0° C. | 0.1199 | 0.1201 | 0.1216 | 0.1203 | 0.1210 | 0.1215 |
| | tan δ @ 60° C. | 0.0878 | 0.0882 | 0.0883 | 0.0880 | 0.1001 | 0.1123 |

Note: A means "polymerization conditions and properties."
B means "property of vulcanized rubber."

The results of the table 3 were similar to those of the table 2. More specifically, it was noted that when each BR specimen having both ends of polymer chain modified (Examples 5 to 8), so prepared using the modified monofunctional anionic polymerization initiator according to this invention was compared with other BR specimens having one end of polymer chain modified (Comparative example 3) or having no polymer chain modified (Comparative example 4), the microsturcture and Mooney viscosity (molecular weight) of polymer was similar but each BR specimen having both ends of polymer chain modified showed better property of vulcanized rubber than other BR specimens with one end of polymer chain modified. In particular, each BR specimen having both ends of polymer chain modified proven to be better effective than other BR specimens with one end of polymer chain modified from the standpoint of the low fuel cost, since the former had extremely low tan δ value at 60° C., an indices of rolling resistance in tire operation.

As described above, this invention has several advantages in that (1) modified anionic polymerization initiators having a higher solubility in a nonpolar hydrocarbon solvent (e.g., 1,1-di(4-dimethylaminophenyl)-3-methylpentyllithium and 1,1-di(4-dimethylaminophenyl)-3-methylpentyllithium) can be synthesized, (2) through the use of the initiators of this invention, SBR or BR with both ends of polymer chain modified by solution polymerization can be easily controlled during reaction, (3) the properties of SBR or BR of this invention have proven to be excellent from the vulcanization test results, and (4) in particular, the reduction of dynamic loss coefficient (tan δ) at a high temperature (60° C.) has contributed much to lower fuel cost.

What is claimed is:

1. A process for preparing styrene-butadiene rubber or butadiene rubber by solution polymerization in such a manner to polymerize 1,3-butadiene alone or with styrene in a nonpolar hydrocarbon solvent using a compound represented by the following formula I as an initiator:

Formula I

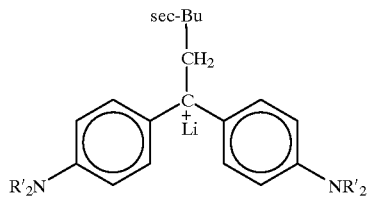

wherein,

R' is an alkyl group of 1 to 3 carbon atoms, and sec-Bu is a secondary butyl group.

2. The process according to claim 1, wherein it comprises the steps in which:

the compound represented by the formula I is reacted with 1,3-butadiene alone or with styrene to give a polymer represented by the following formula II; and the polymer represented by the formula II is reacted with a modifier to prepare styrene-butadiene rubber or butadiene rubber having both ends of polymer chain modified, represented by the following formula III:

Formula II

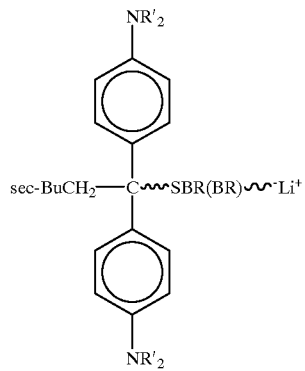

wherein,
R' and sec-Bu are same as defined above;
SBR is a styrene-butadiene rubber; and,
BR is a butadiene rubber
Formula III

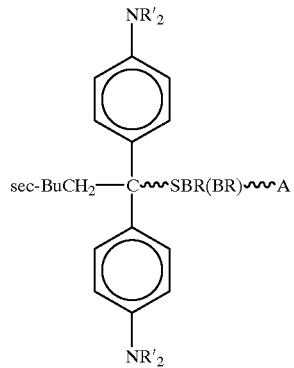

wherein,
R', sec-Bu, SBR and BR are same as defined above;
A is —(CH$_2$)n Si(OEt)$_3$ (wherein n is 0~3), —Sn(Bu)$_3$ or the following group:

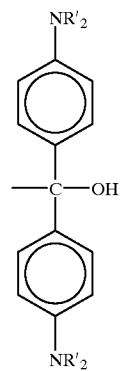

wherein, R' is same as defined above).

3. The process according to claim 1, wherein said styrene-butadiene rubber or butadiene rubber contains 0 to 40 wt % of styrene, while vinyl contents of butadiene portion is in the range of 20 to 80 wt %.

4. The process according to claim 2, wherein said styrene-butadiene rubber or butadiene rubber contains 0 to 40 wt % of styrene, while vinyl contents of butadiene portion is in the range of 20 to 80 wt %.

* * * * *